INVENTORS
MELVIN M. SEELOFF
ROBERT ANDERSON
BY Francis J. Klempay
ATTORNEY

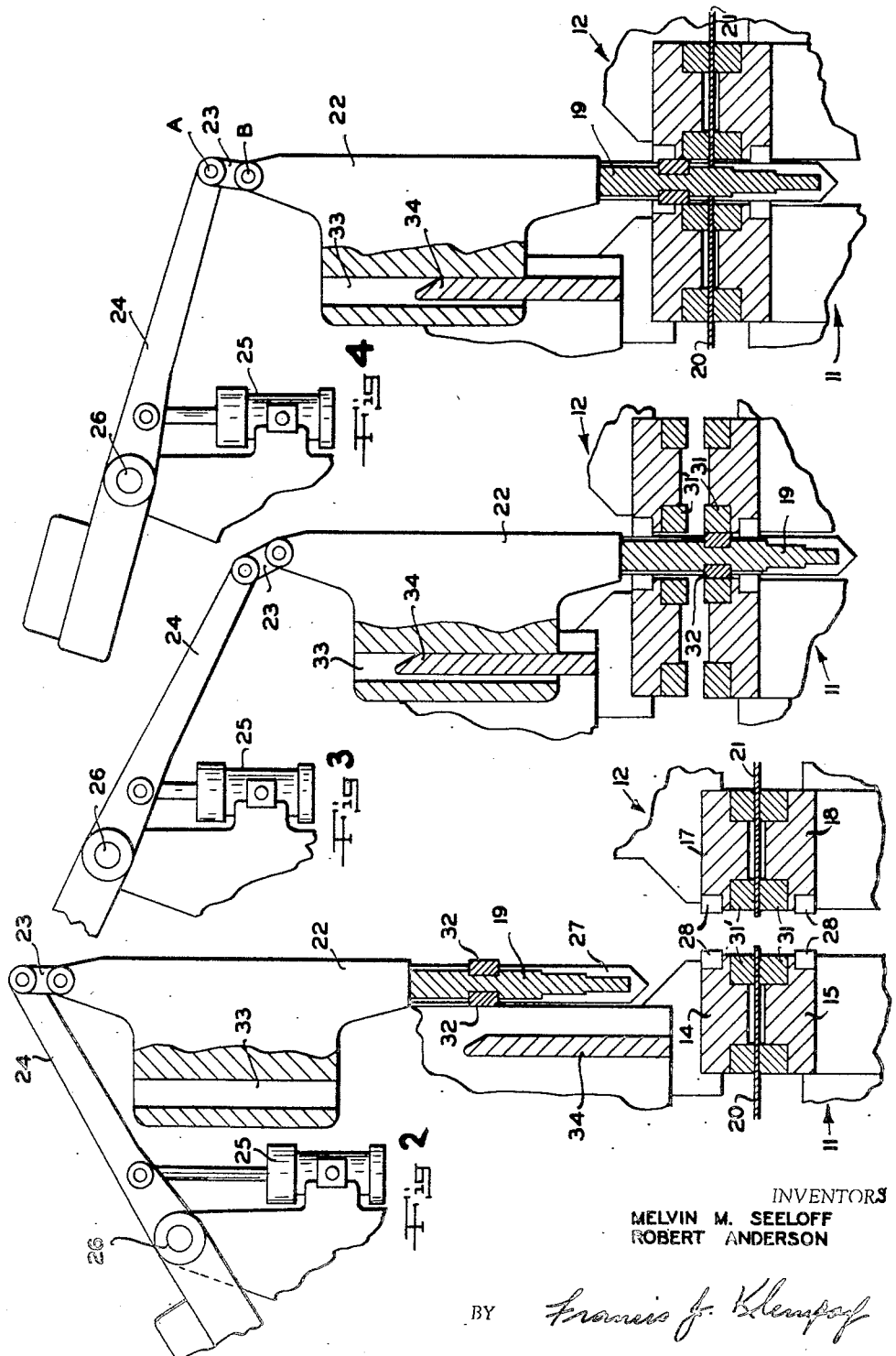

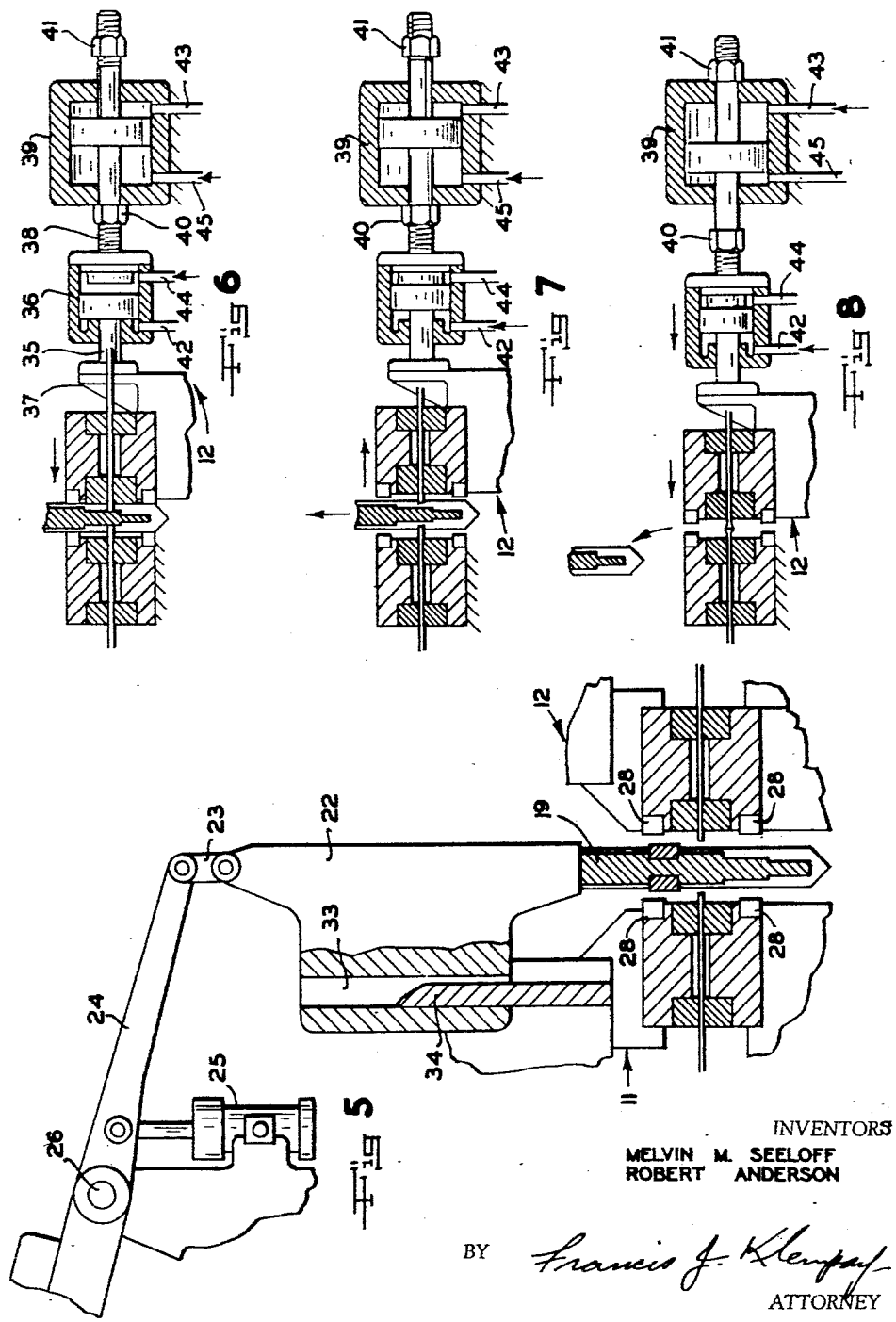

United States Patent Office 2,794,111
Patented May 28, 1957

2,794,111

ACTUATING MECHANISM, PARTICULARLY FOR STRIP WELDERS

Melvin M. Seeloff and Robert Anderson, Warren, Ohio, assignors to The Taylor-Winfield Corporation, Warren, Ohio, a corporation of Ohio Original application May 5, 1952, Serial No. 286,041, now Patent No. 2,758,184, dated August 7, 1956. Divided and this application April 1, 1954, Serial No. 420,234

2 Claims. (Cl. 219—97)

This application is a division of our co-pending application Ser. No. 286,041, now U. S. Patent No. 2,758,184, filed May 5, 1952, for "Spacer Bar and Die Cleaner Mechanism for Strip Welders."

The present invention relates to actuating mechanisms, and more particularly to an improved actuating mechanism or system having specially advantageous use in the electric resistance flash welding art in the operation of large strip welders, for example.

It is an object of the present invention to provide a novel actuating mechanism, particularly for use in driving the movable platen member of a large strip welding machine whereby the operations of preparing the machine for welding and of aligning the strip material in the machine are substantially facilitated and simplified. Further in this regard, it is an object of the invention to provide a novel actuating mechanism for strip welders whereby there may be readily incorporated into the welding apparatus improved mechanisms for spacing the strip material for welding and for cleaning the welding dies of random flash particles preparatory to each welding operation.

In the practice of joining strip ends by resistance welding methods it is common to first align and clamp the adjacent strip ends in predetermined spaced relationship in the welding machine, whereupon the welding dies are closed together according to a predetermined pattern of movement whereby the strip ends are first "flashed" or softened and then moved forcibly together or "upset" to fuse the separate strip sections into a continuous length of material.

To properly align and space the strip ends prior to welding it has been proposed to employ a suitable gauge bar which is inserted between the welding dies so that the strip ends may be moved into abutting relation with the gauge bar and thereby be spaced and aligned with substantial precision. Heretofore, for this purpose, it has been common to employ a vertically movable gauge bar having tapering gauge faces thereon so that the gauge bar could be removed from between the strip sections without damaging the same. We have found this type of gauge device to be unsatisfactory in certain respects, however, particularly in that the skewed gauging faces tend to cause misalignment of the adjacent strip ends, and this is particularly noticeable in the welding of light materials.

On the other hand, the use of gauging devices having parallel gauge faces has been heretofore deemed impractical since in order to remove the gauge bar from between the strip sections it is necessary to back off the strip sections somewhat, a time- and power-consuming operation in large institutions due to the necessarily large size of the actuating devices. Thus, it is a specific object of this invention to provide a novel and improved actuating mechanism or arrangement for operating the movable platen or die carrier of a large electric resistance flash-butt welding machine whereby a gauging device having parallel gauging faces may be advantageously employed. More specifically, it is an object of the invention to provide a novel actuating mechanism for large electric resistance flash-butt welders whereby the welding platens may be readily separated following the gauging operation so that the gauging bar may be removed without damaging the ends of the material to be welded.

Yet another and still more specific object of the invention is the provision of a novel actuating device for the movable platen of a large electric resistance welding device comprising a large diameter relatively long stroke main hydraulic actuating device and a series connected small diameter relatively short stroke auxiliary hydraulic actuating device, the arrangement being such that following a gauging operation the movable platen is retracted by the small diameter actuator or actuators, whereupon the flashing and upset operations are carried out by means of the main actuator or actuators. The arrangement is such that the use of a spacer or gauge bar with parallel gauge faces is rendered consistent with the general objectives of speed in operation and accurate control of the movable die members during all phases of the welding procedure.

The above and other objects and advantages of our invention will become apparent upon full consideration of the following detailed specification and accompanying drawing wherein is illustrated a certain preferred embodiment of our invention.

In the drawing:

Figures 2–5 are fragmentary section views of the apparatus of Figure 1 illustrating the same in various operating positions; and Figures 6–8 are fragmentary section views of the apparatus of Figure 1 showing particularly our novel arrangement for controlling the movement of the welder dies.

Figure 1:
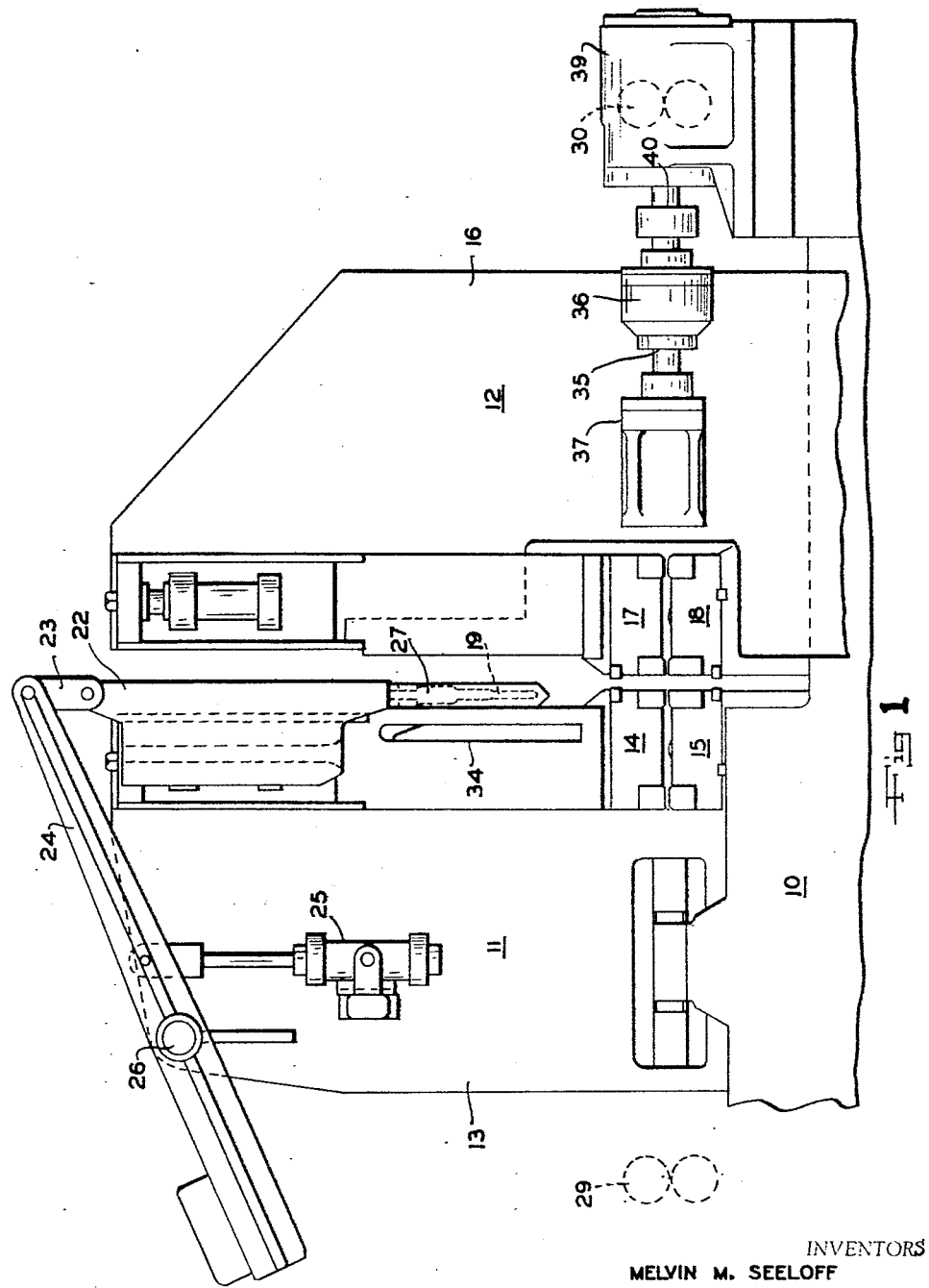
Figure 1 is a fragmentary side elevation of a flash-butt strip welder constructed in accordance with the teachings of our invention.

In Figure 1 the reference numeral 10 designates a fixed machine base upon which is mounted, in accordance with usual welding practice, a fixed platen 11 and movable platen 12. Fixed platen 11 is secured to the base 10 in normally fixed relation but may be provided with conventional adjustments, not shown, for obtaining proper strip alignment. The illustrated apparatus contemplates the accommodation of strip of widths in excess of fifty to sixty inches, and accordingly platen 11 comprises a pair of spaced upstanding frame members 13 whereby the strip, not shown, my pass longitudinally of the welding apparatus, or for example in a direction from platen 12 to platen 11, between the spaced frame members 13. A pair of die members 14 and 15 are carried by the fixed platen 11 for clamping the end portion of a strip to be welded, and it will be understood that the apparatus of Figure 1 includes such control and structure as is necessary to apply adequate clamping pressure between the die members 14 and 15. A preferred structure for this purpose is disclosed in our copending related application Ser. No. 282,766, now U. S. Patent No. 2,710,903, filed April 17, 1952, entitled "Work Holding Apparatus for Flash-Butt Welding Machines."

Movable platen 12 is constructed similarly to the fixed platen 11, including spaced upstanding frame members 16 and upper and lower die members 17 and 18, and is conventionally mounted on base 10 for slidable movement toward and away from fixed platen 11.

Normal operation of flash-butt welding apparatus of the type herein illustrated comprises a first step of positioning platen 12 a predetermined distance from the fixed platen 11. The trailing and leading end portions of two successive coils or sheets are then properly spaced relative to the platens 11 and 12 whereupon die members 14 and 15, and 17 and 18 are caused to close to firmly clamp the end portions in the desired relation. The actual welding operation may then be carried out by causing electric current to pass through the contiguous end surfaces of each of the strips or coils while effecting suitable advancing or closing movements of the movable platen 12 in the direction of the fixed platen 11.

Our apparatus incorporates, for the purpose of spacing adjacent strip ends, a spacer bar member 19 having a plurality of parallel gauging faces thereon, each of a different gauging thickness. In the preferred mode of operation spacer bar 19 is disposed vertically and is inserted between the fixed and movable platens 11 and 12 as shown in Figure 4, for example, whereby upon subsequent movement of strips 20 and 21 toward each other the end surface of each of the strips will abut opposite gauge faces of the spacer bar 19 and will accordingly be maintained in a predetermined separation. It will be understood that prior to the insertion of spacer bar 19 platens 11 and 12 are properly prepositioned in a "work loading" position, and thus when the strips 20 and 21 abut the spacer bar 19 the cooperating die members of each platen may be closed under pressure to properly clamp the strip ends in readiness for a welding operation.

Spacer bar 19 is rigidly secured at its upper end to a vertically disposed carrier member 22 which is adapted in a manner to be subsequently described to support and guide the bar 19 in movement to and from gauging and retracted positions. Pivotally secured to the upper end of carrier member 22 is a short link 23 which is in turn pivotally secured to a lever arm 24. Lever arm 24, as shown in Figure 1, is pivotally mounted on the fixed platen 11 by means of a shaft 26, and it will be readily observed that pivotal movement of the lever arm 24 will cause carrier member 22 and spacer bar 19 to be moved vertically upward or downward and also horizontally to a certain extent due to the presence of a horizontal component in the arcuate movement of the lever 24.

While the present description refers to a single lever arm 24 and carrier 22, it will be understood that a spaced pair of such arms and carriers is preferably provided, i. e., one at each end of the spacer bar 19, and that a larger number may be utilized if desired where unusually wide strip or sheet metal is to be accommodated. Where more than one lever arm and carrier are utilized suitable interconnecting means may be provided to synchronize the movement thereof as will be readily appreciated.

Lever arm 24 is motivated by means of a conventional fluid operated actuating device 25, the cylinder part of which is mounted on the frame member 13 while the piston rod is connected to the lever arm 24 outwardly of the point of pivotal mounting thereof. By suitable application of fluid pressure to the actuator 25 lever arm 24 may be caused to pivot in a clockwise or counterclockwise direction as may be desired.

Secured to each end of the spacer bar member 19 is a guide bar 27 which is preferably slightly wider than the spacer bar 19 and extends below the lower end extremity thereof. For cooperation with the guide bars 27 we have provided at each end corner of each of the die members 14–18 a hardened guide block 28. Thus, by appropriate prepositioning of the movable platen 12 with respect to the fixed platen 11 preparatory to inserting therebetween spacer bar 19, the latter may be provided with accurate and rigid guidance in vertically upward or downward movement. The position of the movable platen 12 wherein guide blocks 28 are properly separated for the insertion and accurate guidance of guide bars 27 is commonly referred to as the "work loading" position, and where desired, suitable automatic control means may be incorporated into the welding apparatus to so position the movable platen 12 after each welding operation.

It will be noted in respect to the vertically guided movement of the spacer bar 19 that while movement of the lever arm 24 is purely arcuate the link member 23 permits movement of the carrier 22 in a horizontal direction with respect to the point of suspension thereof from the lever arm 24. This will be apparent from comparison of Figures 3 and 4.

The rigid and accurate guidance of spacer bar 19 afforded by the guide bars 27 and blocks 28 is advantageous in two important respects. First, feeding of the strip ends into gauging contact with the spacer bar 19 is commonly accomplished by means of pinch rolls 29 and 30 which are necessarily inertia laden. By rigidly restraining the bar 19 we prevent its being misaligned by impact thereagainst of the inwardly moving strip. Secondly, we have found it desirable to incorporate in the gauging apparatus means for trimming weld flash and other foreign matter from the adjacent faces of the die members and electrode bars 31 and pressure bars 31' mounted thereon. Thus, by accurately guiding the movement of the spacer bar 19 we have been able to mount thereon a pair of horizontally disposed cutter bars 32 which are so arranged as to pass over the faces of the die members 14–18 and electrode and pressure bars 31 and 31' during downward movement of the spacer bar 19.

According to the teachings of the invention spacer bar 19 and the supporting and operating elements therefor are so proportioned that lever arm 24 is approximately horizontally disposed when the spacer bar 19 is in a gauging position, but is directed substantially upward from the horizontal when spacer bar 19 is withdrawn upwardly into a retracted position. The arrangement is such that the point of suspension of carrier 22 is moved substantially to the left as shown in Figure 2, and accordingly spacer bar 19 hangs therefrom in a position substantially to the left of the point of meeting of the strip sections to be welded. The spacer bar is thereby protected from direct impingement of flash during the welding operation. Maintenance time on the spacer apparatus is thus reduced to a practical minimum.

In moving the spacer bar 19 from a retracted and inoperative position as shown in Figure 2 to operating position between platens 11 and 12 it is important that the bar 19 be properly inserted between the guide blocks 28 so that the guide bar 27 will not bind during the initial stages of the insertion. To this end we have provided a keyway 33 in carrier 22 which is adapted for cooperating engagement with a key 34 which is rigidly mounted on the fixed platen 11. For a purpose which will subsequently be disclosed, keyway 33 is somewhat wider than is key 34 so that carrier 22 may be loosely guided thereby in its vertical movement.

As will be apparent from the drawing, the key 34 is so oriented on the fixed platen 11 that engagement thereof with the keyway 33 in carrier 22 begins during the initial insertion of the guide bar 27 between blocks 28. Thus the apparatus is provided with additional guidance until guide bar 27 engages the lower blocks 28 whereupon guidance is provided substantially wholly by blocks 28 and bar 27. Bar 27 is preferably tapered at its lower end portion to facilitate initial entry into the upper guide blocks 28.

After spacer bar 19 is initially inserted between platens 11 and 12 it is caused to move, by continued application of fluid pressure to the upper end of actuator 25, to a fully downward position as shown in Figure 3. When the apparatus has reached this position cutter bars 32 have moved completely across the faces of the lower electrode bars 31 and the pressure bars 31' and the same are thereby free of interfering flash particles and are in readiness for a new welding operation. Fluid is then applied to the lower end of actuator 25 to cause lever arm 24 to move upwardly a predetermined distance to position one of the plurality of gauge faces of the spacer bar 19 opposite electrode bars 31 and pressure bars 31'. Motive power is then applied to pinch rolls 29 and 30 to cause strip sections to move inwardly from both directions toward the gauge faces of bar 19, and the pinch rolls are of course stopped when the inwardly moving strip sections abut the spacer bar. Upon subsequent removal of the bar 19 to its retracted and protected upper position the welding operation may proceed by appropriate inward movement of platen 12 and application of welding energy to the electrode bars 31.

Successful use of a spacer bar having parallel rather than tapered gauge faces requires that the platens 11 and 12 be slightly separated before the spacer bar is withdrawn to relieve the pressure exerted thereon by the clamped strip sections. This is particularly important where thin stock is to be welded inasmuch as the frictional drag of the end surfaces of the strip upon the gauge faces tends to cause upward turning of the strip ends—the occurrence of which would be prohibitive to carrying out a satisfactory welding operation. Such separation is also desirable to prevent unnecessary wear upon the gauge face as will be readily understood.

To permit platens 11 and 12 to be slightly separated for withdrawal of the spacer bar 19 while maintaining operation of the apparatus consistent with the general objectives of speed and accuracy of platen movement we have provided a novel actuating arrangement for the movable platen 12, which arrangement is illustrated in Figure 1, and schematically in Figures 6–8. Referring particularly to the schematic representations in Figures 6–8 it will be observed that the piston member 35 of a small diameter short stroke hydraulic actuator 36 is rigidly connected to the movable platen 12 by means of a bracket 37. Preferably the piston 35 is substantially aligned horizontally with the pass line of the strip sections to be welded whereby forces applied to the platen 12 will be properly balanced. And it will be understood that moving force is preferably applied to each side of the platen 12 by duplicate actuating devices positioned in straddling relation to the strip. This is in accordance with usual strip welded construction.

Rigidly connected to the cylinder of actuator 36 is the piston rod 38 of a large diameter relatively long stroke hydraulic actuator 39, known conventionally as an "upset cylinder." In the illustrated apparatus a piston rod 38 extends outwardly of both ends of the upset cylinder 39 and is provided with means, such as adjustable bucking nuts 40 and 41, for limiting movement of the rod 38 in either longitudinal direction. Nut 40 may be used, for example, to normally limit retracting movement of movable platen 12 to movement into the work loading position, while nut 41 may be used to control the final die opening or the ultimate spacing of the die members at the end of the welding operation. Nut 41 particularly should be readily adjustable to provide upset adjustment for strip sections of various thicknesses. A preferred arrangement for providing upset adjustment is fully disclosed in our co-pending related application Ser. No. 286,042, filed May 5, 1952, entitled "Die Spacing Means for Welding Apparatus," now U. S. Patent No. 2,636,966, issued April 28, 1953.

As will be observed in Figures 6–8, the right hand end of actuator 36 is provided internally with a circular land or abutment against which piston 35 is adapted to rigidly bottom upon application of fluid pressure to the rod end of actuator 35 through conduit 42. According to the principles of the invention, fluid pressure is applied to the small actuator 35 substantially at all times through conduit 42, and accordingly, when pressure is applied to the head end of actuator 39 through conduit 43 force is transmitted to the movable platen 12 by a direct and rigid metal-to-metal contact through the small actuator 36. Thus the necessarily large upset pressures may be applied independently of the actuator 36 in the manner illustrated in Figure 8.

At the end of a welding operation fluid pressure may be applied simultaneously to actuators 36 and 39 through conduits 44 and 45 respectively, causing piston rod 38 and actuator 36 to move to the right and piston 35 to move to the left with respect to actuator 36. Upon the nut 40 reaching its limit stop, as shown in Figure 6, further movement of piston rod 38 to the right is prevented and movement of piston 35 to the left with respect to the actuator 36 is positively limited as piston 35 bottoms against the left hand end of the actuator. It should thus be apparent that by proper adjustment of nut 40 we may provide that with actuators 36 and 39 conditioned as shown in Figure 6 the movable platen 12 will be accurately positioned in the work loading position. Cleaning of the dies, and feeding and spacing of the workpieces may then be effected in the manner previously described.

With the workpieces properly spaced and clamped, fluid pressure may be applied to conduit 42 leading into the left hand end of actuator 36. Piston 35, and movable platen 12, are thereby caused to move to the right until the piston 35 bottoms at the right hand end of actuator 36, whereupon the connection between piston rod 38 and the movable platen 12 will again be direct and rigid. In this operation all pressure is relieved from the spacer bar 19 and from the guide bars 27 therefor, and the same may be moved into a retracted position by application of fluid pressure to the lower end of actuator 25.

It is contemplated that the piston 35 will have a relatively short operating stroke, as for example one or two inches, and that the fluid displacement required in moving the piston 35 through its full operating stroke will be extremely low—sufficient only to overcome the sliding friction of the apparatus—whereby the short retracting movement of the platen 12 may be carried out in a minimum of time.

As a further means of preventing unnecessary wear upon the gauge faces of spacer bar 19 and/or multilation of the end portions of thin workpieces, we have provided a novel arrangement whereby the spacer bar 19, upon platen 12 being moved into a retracted position as in Figure 8, is caused to swing outwardly of the platen 11 to a position substantially centrally intermediate the fixed and movable platens 11 and 12.

As illustrated in Figure 4, lever arm 24 is so proportioned that its point of pivotal connection with link 23 (point A) lies to the right to the point of pivotal connection of the link 23 with carrier 22 (point B) at all times when spacer bar 19 is positioned so as to present a gauging face at the pass line of the strip sections 20 and 21. Although Figure 4 illustrates the use of the widest gauge faces only, the above fact may be readily ascertained by noting that point A will continue to move outwardly a slight amount as the spacer bar 19 is raised to present new gauging faces to the pass line. Point B is of course confined to movement along the vertical longitudinal axis of the spacer bar 19 by virtue of the heretofore described guiding means provided for the spacer bar 19.

Thus, it will be apparent that upon releasing movement of the movable platen 12 by application of fluid pressure through conduit 42, spacer bar 19 will, by the action of gravity, tend to move outwardly of the movable platen 11 and thus away from the die members 14 and 15 thereof. By providing a certain measure of looseness between key 34 and keyway 33 provided in the carrier 22 we have provided that the spacer bar 19 may swing by gravity to a point substantially centrally intermediate the separated platens 11 and 12, as shown in Figure 5, from which position the bar 19 may be withdrawn into a retracted position without contacting the end surfaces of either of the clamped strip sections 20 or 21.

In the preferred construction of the apparatus keyway 33 and key 34 are so dimensioned that contact is made between one surface of the keyway 33 and key 34 when the bar 19 is vertically guided by means of guide bar 27 and blocks 28, and contact is made between opposite surfaces of members 33 and 34 to limit outward swinging movement of the bar 19 to a position spaced from both platens 11 and 12.

The advantages of our invention should now be apparent. We have provided a wholly practical arrangement for utilizing a strip spacing member having a plurality of stepped pairs of parallel gauge faces whereby a flat abutment is afforded for contact by inwardly moving strip sections. Heretofore slightly tapered gauge surfaces have been commonly provided whereby upon a short withdrawal movement of the spacing or gauging member the gauging surfaces were automatically drawn away from the end surfaces of the strip sections. We have found such tapered surfaces to be undesirable, however, particularly for thin material since a skewed contact with the strip ends is inherent in such apparatus, and a slight turning-up of the end portions of the material inevitably results. Our invention, on the other hand, teaches the use of parallel gauging surfaces with a novel arrangement for rapidly withdrawing the movable platen 12 whereby the spacer bar 19 moves away from the end surfaces of the strip and may be readily withdrawn into a retracted position.

By providing large and small platen actuating members, arranged in series relation and independently operable, the movable platen 12 may be quickly retracted for removal of the spacing bar 19, and it is important to note that the upset cylinder 39 remains wholly unaffected during such retraction. While the upset cylinder must necessarily be of large diameter to properly carry out the welding operation, the series connected actuator 36 may be of small diameter and short stroke whereby the same may be operated in a practical minimum of time from a hydraulic power source of normal capacity. Our arrangement further provides that during the flashing and upset portions of a complete welding cycle a direct and rigid connection exists between the upset cylinder 39 and the movable platen 12 through the interposed actuator 36.

Our novel actuating device of course has possible application in apparatus other than welding apparatus, as specifically described. Moreover certain departures from the exact structure illustrated may be effected within the clear teachings of the invention. Reference should therefore be had to the following appended claims in determining the full scope of the invention.

We claim:

1. In combination with a flash-butt welding machine of the type having a generally vertically movable gauge bar having parallel gauging faces, a fixed platen and a movable platen adapted to be moved into a first position with respect to said fixed platen for the loading of workpieces into said platens and gauging the workpieces, to be retracted from said fixed platen after said loading to allow the retraction of said gauge bar, and to be thereafter forcibly and controllably moved toward said fixed platen during flashing and upsetting portions of a welding operation, a high power fluid actuator comprising a fixed cylinder member and a movable piston member, a low power fluid actuator comprising a cylinder part connected to said movable piston member and a piston part connected to said movable platen, said low power actuator having a short operating stroke and having abutment surfaces on said cylinder and piston parts whereby upon full retracting movement of said piston part said piston and cylinder parts are moved into abutting engagement, said movable piston member being thereby placed in direct mechanical connection with said movable platen for the carrying out of the flashing and upset portions of a welding operation.

2. In combination with a flash-butt welding machine of the type having vertically retractable gauging means with parallel gauging surfaces, a fixed platen and a movable platen adapted to be moved into a first position with respect to said fixed platen for the loading of workpieces into said platens and gauging the workpieces, to be retracted from said fixed platen after said loading to allow the retraction of said gauging means, and to be thereafter forcibly and controllably moved toward said fixed platen during flashing and upsetting portions of a welding operation, means to move said movable platen toward said fixed platen during flashing and upset portions of a welding operation comprising a high power fluid actuator, and means to move said movable platen to and from said first position comprising a low power fluid actuator interconnecting said movable platen and the movable part of said high power actuator, said low power actuator being adapted upon retracting movement of its movable part to retract said movable platen from said first position, and said low power actuator having means to rigidly limit the retracting movement of its movable part whereby said high power actuator is directly coupled with said movable platen.

References Cited in the file of this patent

UNITED STATES PATENTS

| | | |
|---|---|---|
| 429,667 | Webb | June 10, 1890 |
| 512,790 | Bachman | Jan. 16, 1894 |
| 1,273,203 | Thomson | July 23, 1918 |
| 1,561,341 | Martin | Nov. 10, 1925 |
| 1,865,105 | Houplain | June 28, 1932 |
| 2,286,798 | Flowers | June 16, 1942 |
| 2,298,051 | Gordon et al. | Oct. 6, 1942 |